United States Patent [19]
Nishimura

[11] Patent Number: 5,619,714
[45] Date of Patent: Apr. 8, 1997

[54] MICROCOMPUTER HAVING AN INSTRUCTION DECODER WITH A FIXED AREA AND A REWRITABLE AREA

[75] Inventor: Kiyoshi Nishimura, Kyoto, Japan

[73] Assignee: Rohm Co., Ltd., Kyoto, Japan

[21] Appl. No.: 390,428

[22] Filed: Feb. 17, 1995

Related U.S. Application Data

[63] Continuation of Ser. No. 81,186, Jun. 25, 1993, abandoned.

[30] Foreign Application Priority Data

Jun. 25, 1992 [JP] Japan .................................. 4-167500

[51] Int. Cl.⁶ ........................................................ G06F 9/30
[52] U.S. Cl. ...................... 395/385; 395/800; 364/259.9; 364/DIG. 1
[58] Field of Search ................................. 395/800, 375; 364/259.9, DIG. 1

[56] References Cited

U.S. PATENT DOCUMENTS

| | | | |
|---|---|---|---|
| 3,987,418 | 10/1976 | Buchanan | 395/800 |
| 4,992,933 | 2/1991 | Taylor | 395/800 |
| 5,097,407 | 3/1992 | Hino et al. | 395/375 |
| 5,278,786 | 1/1994 | Kawauchi et al. | 365/185.11 |

*Primary Examiner*—Alyssa H. Bowler
*Assistant Examiner*—John Harrity
*Attorney, Agent, or Firm*—Nikaido Marmelstein Murray & Oram LLP

[57] ABSTRACT

When a rewriting instruction data is provided to an instruction decoder from a read only memory for a program, the instruction decoder decodes the data and provides an instruction rewriting control signal to a writing block. Thereby, the writing block receives a data following the writing instruction data from the ROM and writes the received data in the rewritable area of the instruction decoder. When an instruction data is provided to the instruction decoder from the read only memory under this condition, an instruction which is different from the instruction therefor output when there is no rewriting instruction is therefor output based on the same instruction.

10 Claims, 4 Drawing Sheets

MICROCOMPUTER HAVING AN INSTRUCTION DECODER WITH A FIXED AREA AND A REWRITABLE AREA

This application is a continuation of application Ser. No. 08/081,186 filed Jun. 25, 1993 now abandoned.

BACKGROUND OF THE INVENTION

1. Field of the Invention

The present invention relates to a microcomputer, and more particularly, to an instruction decoder provided therein.

2. Description of the Prior Art

As shown in FIG. 1, an instruction decoder 2 decodes a data provided from a read only memory (ROM) 1 for a program and outputs an instruction. In forming an instruction, when the instruction data is, for example, an 8-bit data, the number of instructions in an instruction map which can be made with 8-bit data is automatically determined, for example, to be 100.

A specific device which is controlled by the output of the instruction decoder is a multiplexer provided in a microcomputer. There are many combinations of operations of multiplexers, and accordingly, the number of devices provided in a microcomputer which can be operated by instructions is much larger than the number of instructions which are outputs of the instruction decoder. The instruction decoder is different in function from the ROM and a data table ROM; however, it is the same as that of a ROM in structure.

Since the instruction decoder provided in a conventional microcomputer is constituted only by a ROM as described above, the number of instructions which can be formed by one instruction decoder is insufficient. In order to form a substantially large number of instructions, it is necessary to execute the instruction forming operation process in stages (specifically, a plurality of stages of decoding operations are necessary with respect to one instruction data input). A method in which a large number of instructions are formed by an instruction decoder of such a plural stage structure is generally called a complex instruction set computer (CISC) method. The CISC method has drawbacks because the instruction speed is low.

A reduced instruction set computer (RISC) method is a method which is developed from a viewpoint of increasing the instruction speed. The RISC method, in which instructions are extremely simplified, has drawbacks because instructions are so simplified that without a compiler, it is difficult to make the most of the capability of the microcomputer.

SUMMARY OF THE INVENTION

An object of the present invention is to provide a microcomputer capable of forming a large number of instructions in spite of a high instruction speed.

To achieve the above-mentioned object, in a microcomputer of the present invention, at least a part of an instruction decoder is a memory where the decoding function is rewritable.

With such a feature, since different instructions can be therefor output based on the same input by rewriting the decoding function in the rewritable memory portion, more instructions can be formed in spite of the high processing speed.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
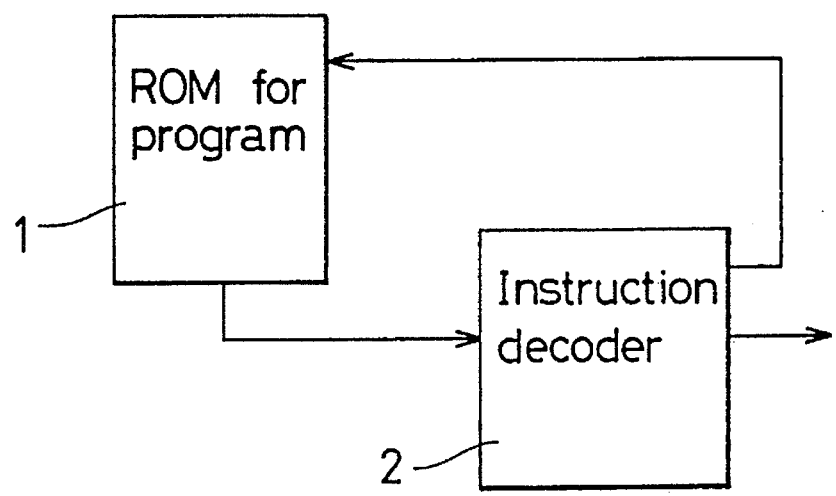
FIG. 1 shows a ROM for a program and an instruction decoder provided in a conventional microcomputer.
Figure 2:
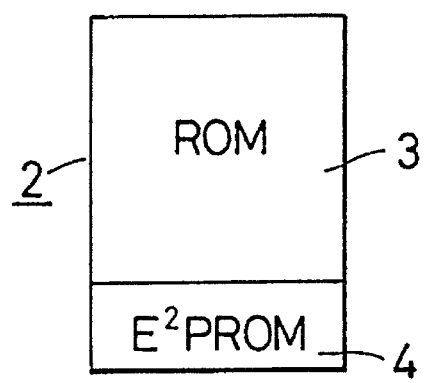
FIG. 2 is a schematic explanatory view showing an instruction decoder provided in a microcomputer embodying the present invention.

In an embodiment of the present invention, as shown in FIG. 2, an instruction decoder 2 is constituted by a fixed area 3 where the decoding function is not rewritable and a rewritable area 4 where the decoding function is rewritable. The fixed area 3 is constituted by a ROM similarly to the prior art. The rewritable area 4 is constituted by an electrically erasable programmable read only memory ($E^2$ PROM). The rewritable area 4 may be a flash ROM or a ferroelectric memory (i.e. nonvolatile memory instead of the $E^2$PROM.

The fixed area 3 is in charge of an instruction set at a cycle of a program therefor input thereto from a ROM for a program, and executes it at a high speed. At another cycle of the program, the instruction set is written to the rewritable area 4 and executed. In this case, a speed which is as high as the speed realized by the RISC method is also realized.

Figure 3:
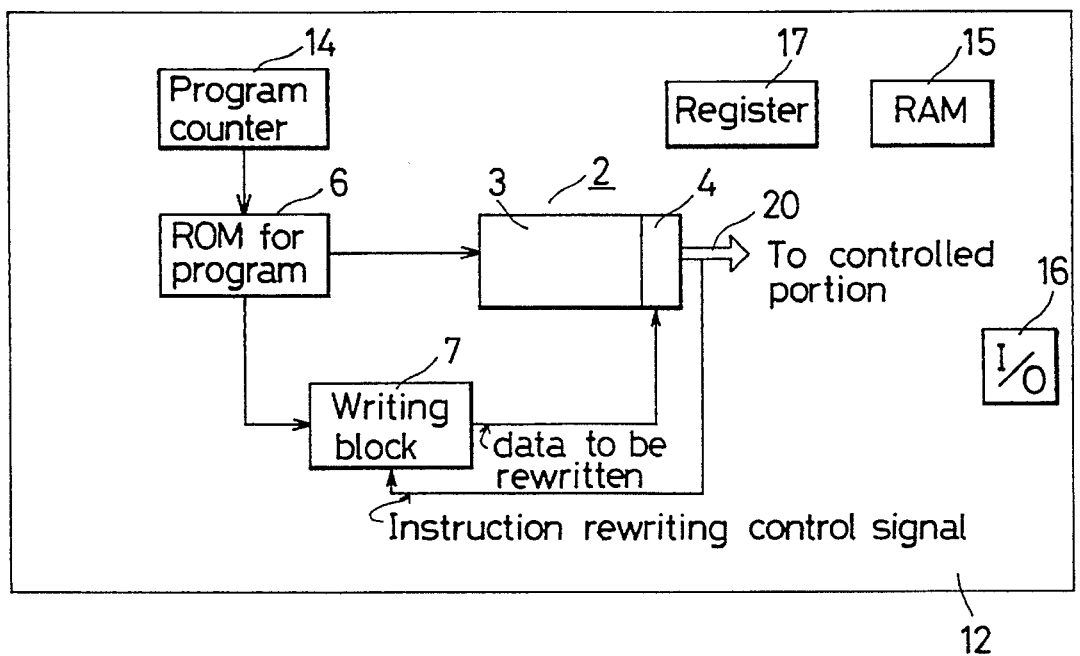
FIG. 3 is a block diagram showing a system for writing in the rewritable area of the instruction decoder a data to be written for rewriting.
Figure 4:
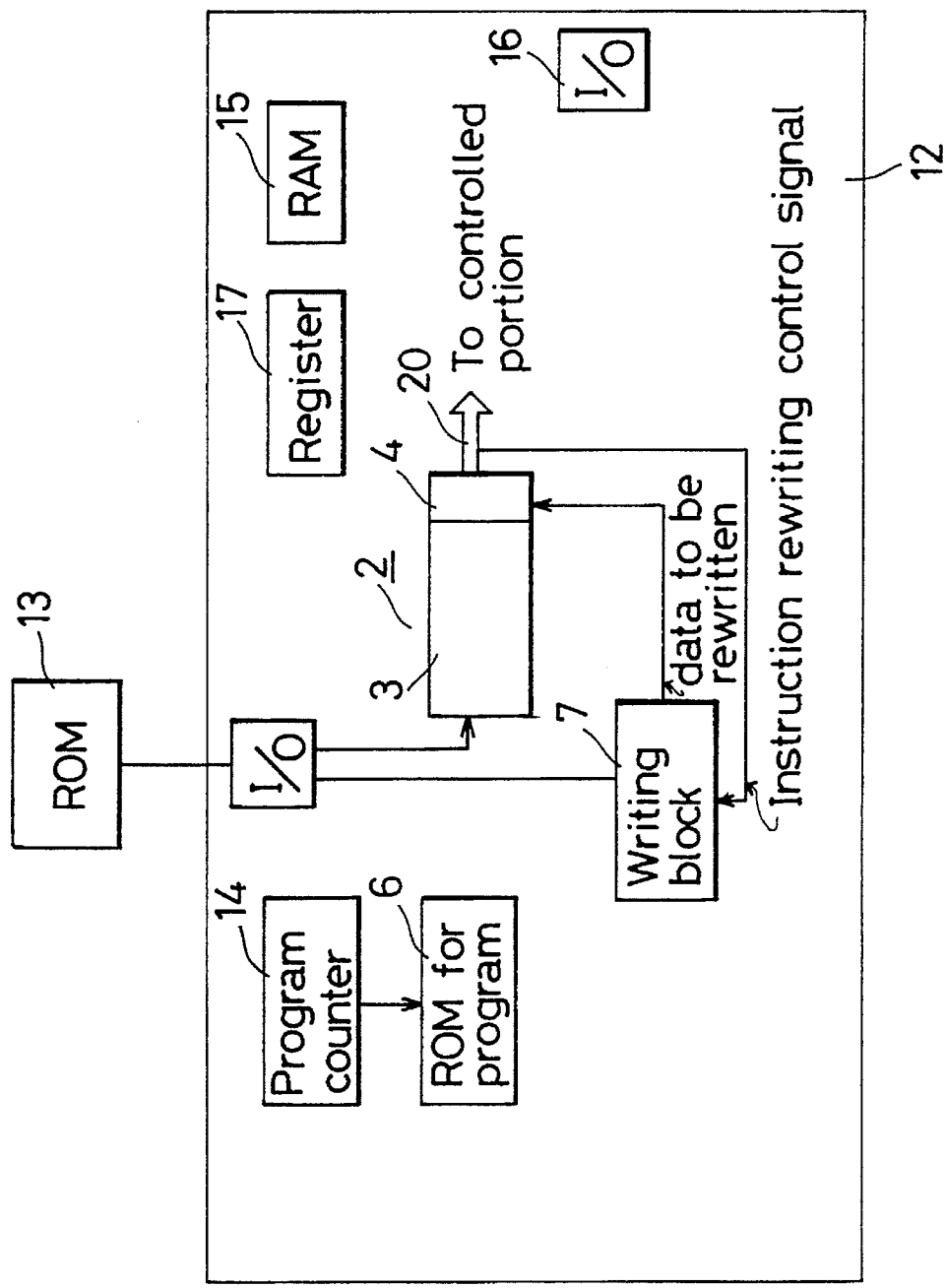
FIG. 4 is a block diagram showing another system for writing in a rewritable area of the instruction decoder a data to be written for rewriting.

In order to rewrite the instruction set as described above, it is necessary to write a data to be written for rewriting (hereinafter referred to as rewriting data) to the rewritable area 4. The arrangement for the rewriting is shown in FIG. 3. Numeral 6 represents a ROM for a program provided with rewriting instruction data. Numeral 7 represents a writing block which receives the rewriting data from the ROM 6 and writes the rewriting data to the rewritable area 4 of the instruction decoder 2 based on an instruction rewriting control signal from the instruction decoder 2. In this case, the ROM 6 is a ROM for a program provided in a microcomputer chip 12. It may be an external ROM 13 as shown in FIG. 4.

Subsequently, operation by the arrangement of FIG. 3 will be described. The ROM 6 successively outputs the instruction data in response to an operation of a program counter 14. The therefor output instruction data are therefor input to the instruction decoder 2. It is now assumed that when there is no rewriting instruction, the instruction which the instruction decoder 2 outputs by decoding an instruction data A is an instruction to move data stored in a random access memory (RAM) 15 to an input/output put/output (I/O) port 16.

Assume now that a rewriting instruction B is provided from the ROM 6 to the instruction decoder 2. The instruction decoder 2 decodes the data and provides an instruction rewriting control signal to the writing block 7. Thereby, the writing block 7 receives a data (rewriting data C) which follows the data B therefor output from the ROM 6 and writes the data C to the rewritable area 4 of the instruction decoder 2.

When the instruction data A is provided to the instruction decoder 2 from the ROM 6 under this condition, an instruction to move the data stored in the RAM 15 to a register 17 is output. That is, when a rewriting data is written in the rewritable area 4, a different instruction is therefor output based on the same instruction A. When no rewriting data is written in the rewritable area 4, as described above, the output generated by the decoding of the instruction data A is an instruction to move a data stored in the RAM 15 to the I/O port 16.

Figure 5:
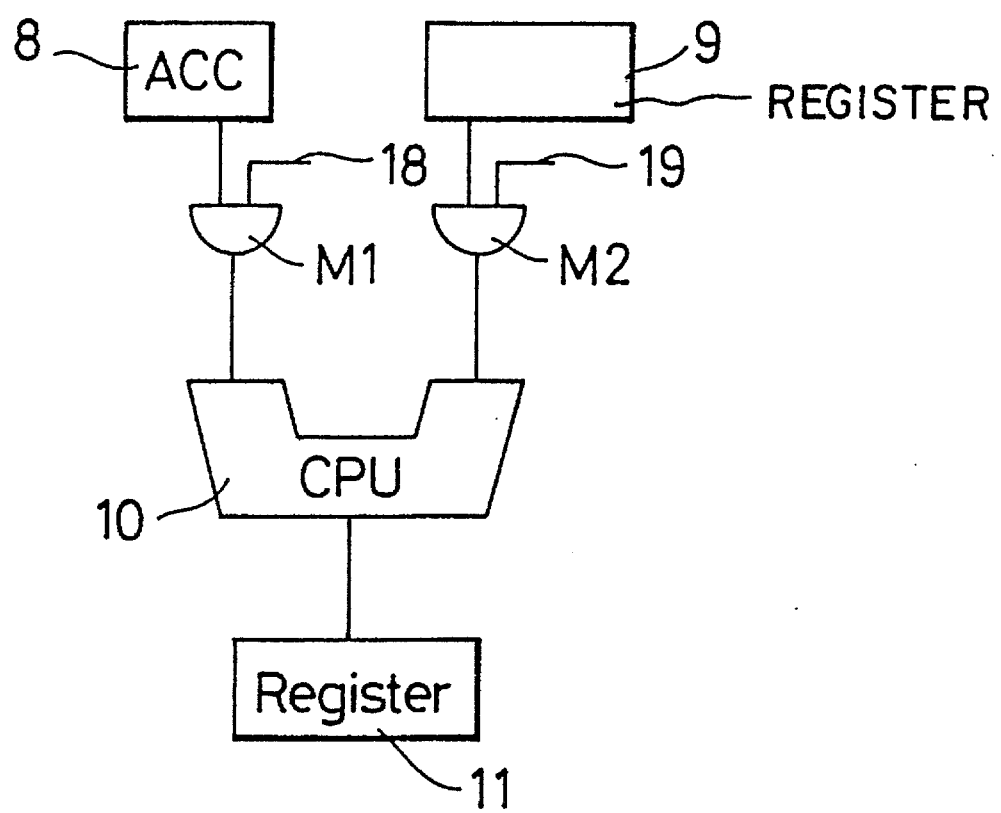
FIG. 5 is a view for explaining an advantage of the present invention.

In a microcomputer having the above-described arrangement, for example, when an accumulator 8 and a register 9 are connected to a central processing unit (CPU) 10 through multiplexers M1 and M2, respectively, a plurality of data transmission conditions can be considered according to the combination of operations of the multiplexers M1 and M2, such as (a) only the data at the accumulator 8 is transmitted to a register 11, (b) only the data at the register 9 is transmitted to the register 11, and (c) both of the data are simultaneously transmitted to the CPU 10 and calculated, and the calculation result is transmitted to the register 11. When it is impossible to store all of the instructions on the data transmission conditions in a map of the instruction decoder, conventionally, only two instructions that the multiplexer M1 is ON and the multiplexer M2 is OFF and that the multiplexer M1 is OFF and the multiplexer M2 is ON are mapped in the instruction decoder, and it is impossible to realize the condition (c). In this embodiment, however, when it is necessary to simultaneously activate the multiplexers M1 and M2 and to calculate the data at accumulator 8 and the data at the register 9 at the CPU 10 to transmit the calculation result to the register 11, the condition (c) is realized by writing a rewriting data for realizing the simultaneous activation of the multiplexers M1 and M2. With such a feature, it is possible to execute a complex instruction at a high instruction speed. In FIG. 5, control buses 18 and 19 which are connected to the multiplexers M1 and M2, respectively, are a part of a control bus 20 which is an output line of the instruction decoder 2.

Obviously, many modifications and variations of the present invention are possible in light of the above teachings. It is therefore to be understood that within the scope of the appended claims, the invention may be practiced other than as specifically described.

What is claimed is:

1. A microcomputer comprising:
    an instruction decoder including a) a fixed area constituted by a read only memory where a decoding function is not rewritable, and b) a rewritable area constituted by a rewritable memory where the decoding function is rewritable, wherein both the fixed and rewritable areas decode instruction data which is input thereto and where the decoding function is written in the rewritable area, an instruction is output by the rewritable area which is different from an instruction output by the fixed area based on the same instruction data.

2. A microcomputer according to claim 1, wherein said rewritable memory is an erasable programmable read only memory.

3. A microcomputer according to claim 1, wherein said rewritable memory is a flash memory.

4. A microcomputer according to claim 1, wherein said rewritable memory is a ferroelectric memory.

5. A microcomputer according to claim 1, wherein a rewriting instruction data and a data to be written for rewriting are stored in a read only memory provided on a chip where the microcomputer is formed, and wherein said microcomputer further comprises means for transferring the data from the read only memory to the instruction decoder.

6. A microcomputer according to claim 1, wherein a rewriting instruction data and a data to be written for writing are stored in an external read only memory, and wherein said microcomputer further comprises means for transferring the data from the read only memory to the instruction decoder.

7. A microcomputer according to claim 1, wherein rewriting data is written into the rewritable area based upon an instruction rewriting control signal from the instruction decoder.

8. A microcomputer according to claim 7, wherein said instruction rewriting control signal is generated based upon data input to said instruction decoder.

9. A microcomputer according to claim 1, wherein an input instruction, input to said instruction decoder, being decoded based upon whether the decoding function is stored in the rewritable area.

10. A microcomputer according to claim 1, wherein said rewritable area is constituted by a non-volatile memory.

* * * * *